US010461605B2

(12) United States Patent
Gassner

(10) Patent No.: US 10,461,605 B2
(45) Date of Patent: Oct. 29, 2019

(54) ACTUATOR HAVING A DETACHABLE SLIDE GUIDE FASTENER

(71) Applicant: limoss (Shenzhen) Co., Ltd., Shenzhen, Guangdong (CN)

(72) Inventor: Christian Gassner, Shenzhen (CN)

(73) Assignee: Limoss (Shenzhen) Co., Ltd., Shenzhen, Guangdong (CN)

( * ) Notice: Subject to any disclaimer, the term of this patent is extended or adjusted under 35 U.S.C. 154(b) by 0 days.

(21) Appl. No.: 15/436,619

(22) Filed: Feb. 17, 2017

(65) Prior Publication Data

US 2017/0214289 A1  Jul. 27, 2017

Related U.S. Application Data

(63) Continuation of application No. PCT/CN2016/081182, filed on May 5, 2016.

(30) Foreign Application Priority Data

Jan. 21, 2016  (CN) .................... 2016 2 0057275 U

(51) Int. Cl.
   *H02K 5/26* (2006.01)
   *H02K 7/06* (2006.01)

(52) U.S. Cl.
   CPC ............... *H02K 7/06* (2013.01); *H02K 5/26* (2013.01)

(58) Field of Classification Search
   CPC .................................. H02K 5/26; H02K 7/06
   USPC ............ 310/49.18, 66, 15, 80; 74/89, 89.33, 74/89.38, 89.39
   See application file for complete search history.

(56) References Cited

U.S. PATENT DOCUMENTS

| 6,408,706 | B1* | 6/2002 | Nagai | F16C 29/02 |
| | | | | 384/29 |
| 7,541,707 | B2* | 6/2009 | Hochhalter | B23K 11/31 |
| | | | | 310/80 |
| 8,308,603 | B2* | 11/2012 | Knudsen | F16H 25/20 |
| | | | | 475/150 |
| 9,341,248 | B2 | 5/2016 | Wu | |
| 9,732,832 | B2* | 8/2017 | Kristen | A47C 20/041 |
| 2008/0210029 | A1* | 9/2008 | Wang | F16H 25/20 |
| | | | | 74/89.38 |
| 2010/0192713 | A1* | 8/2010 | Duits | F16H 25/24 |
| | | | | 74/89.23 |

(Continued)

FOREIGN PATENT DOCUMENTS

| CN | 1285903 A | 2/2001 |
| CN | 203230825 U | 10/2013 |
| CN | 103795180 A | 5/2014 |

*Primary Examiner* — John K Kim

(74) *Attorney, Agent, or Firm* — Leydig, Voit & Mayer, Ltd.

(57) ABSTRACT

An actuator includes: a motor; a housing, the housing at least partially covering the motor; a slide guide, wherein one end of the slide guide extends into the housing and another end of the slide guide extends outside of the housing; and a slide guide fastener disposed between the slide guide and the housing, the slide guide fastener comprising a limiting part and a matching part, wherein the limiting part is configured to engage with the slide guide and to be interchangeable with other limiting parts corresponding to other slide guide shapes, and wherein the matching part is configured to engage with the housing and does not need to be changed to accommodate different slide guide shapes.

15 Claims, 7 Drawing Sheets

(56) References Cited

U.S. PATENT DOCUMENTS

| | | | |
|---|---|---|---|
| 2014/0312724 A1* | 10/2014 | Hung | H02K 7/1166 |
| | | | 310/78 |
| 2015/0033538 A1 | 2/2015 | Kristen | |
| 2015/0076972 A1* | 3/2015 | Leiber | B60T 13/741 |
| | | | 310/68 B |
| 2016/0169215 A1* | 6/2016 | Tetzlaff | F04B 17/03 |
| | | | 417/53 |
| 2017/0214289 A1* | 7/2017 | Gassner | H02K 7/06 |

* cited by examiner

ACTUATOR HAVING A DETACHABLE SLIDE GUIDE FASTENER

CROSS-REFERENCE TO RELATED APPLICATIONS

This application is a continuation of International Application No. PCT/CN2016/081182, filed on May 5, 2016. The International Application claims priority to Chinese Patent Application No. 201620057275.3, filed on Jan. 21, 2016. The aforementioned patent applications are incorporated by reference herein in their entireties.

FIELD

The present application relates to an actuator, and more particularly, relates to an actuator provided therein with a slide guide fastener.

BACKGROUND

An actuator, as an element of a product, is mainly applied to equipment such as a sofa, a medical bed, and so on. An existing actuator generally comprises a motor, a worm gear formed as a transmission with the motor, a housing covering around the motor and the worm gear, a spindle with one end fixed in the worm gear, a slide guide sheathed around the spindle and a slide guide fastener and a front cover mounted at two ends of the slide guide respectively, wherein the slide guide fastener is limited on an inner wall of the housing in order to fix the slide guide and the spindle. When the actuator is applied to products with different types or different models, the shape of the actuator will be different because the products are different. Common differences exist in the length of the slide guide, the shape of the slide guide and the configuration of the housing. The slide guide of the actuator is generally made of metal material, and the length of the slide guide can be controlled by a cutting process or a mould. The housing is generally made by plastic injection molding, the configuration thereof can be changed by changing the size of an injection mould or by changing a punch. The whole slide guide should be replaced if the shape of the slide guide needs to be changed. If the slide guide is replaced, the slide guide fastener and the front cover of the slide guide provided at two ends thereof should be also replaced; changing the shape of the slide guide fastener further needs to replace the housing, however, the housing is usually more complex than the slide guide fastener in structure. If there are slide guides with various specifications, they need to match with a variety of slide guide fasteners, and a variety of housings are further needed to match the slide guide fasteners; as a result, the product will have too many components and moulds, such that the cost is high and the producing process is inconvenient.

SUMMARY

In an exemplary embodiment, the present invention provides an actuator. The actuator includes: a motor; a housing, the housing at least partially covering the motor; a slide guide, wherein one end of the slide guide extends into the housing and another end of the slide guide extends outside of the housing; and a slide guide fastener disposed between the slide guide and the housing, the slide guide fastener comprising a limiting part and a matching part, wherein the limiting part is configured to engage with the slide guide and to be interchangeable with other limiting parts corresponding to other slide guide shapes, and wherein the matching part is configured to engage with the housing and does not need to be changed to accommodate different slide guide shapes.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

REFERENCE NUMERALS USED IN THE DRAWINGS

Figure 1:
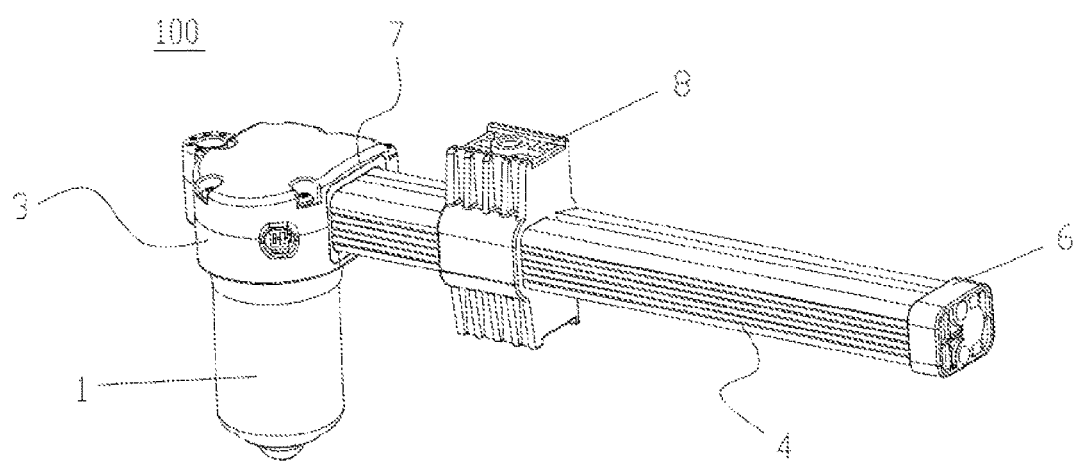
FIG. 1 is a schematic perspective view of an actuator of a first embodiment of the present application.

100. actuator;
1. motor;
2. worm gear;
3. housing;
31. upper housing;
32. lower housing;
34. locating slot;
4. slide guide;
41. first slide guide;
42. second slide guide;
5. spindle;
6. front cover;
7. slide guide fastener;
71. matching part;
72. positioning brim;
73. limiting part;
731. first limiting part;
732. second limiting part;
74. annular wall;
75. through-hole;
8. driving block.

DETAILED DESCRIPTION

Exemplary embodiments of the present invention provide an actuator, which has a universal slide guide fastener, wherein the slide guide fastener can be assembled with different slide guides so as to adapt to different slide guides, such that the replacement of the housing can be avoided and the producing cost is lowered.

In an exemplary embodiment, the invention provides an actuator, comprising: a motor; a housing, the housing covering around the motor; a slide guide, one end of the slide guide extending into the housing, the other end of the slide guide extending outside of the housing, a slide guide fastener being limited between the slide guide and the housing; the slide guide fastener being provided with a limiting part and a matching part, the limiting part is positioned by matching with the slide guide and can be changed along with different shapes of the slide guide, the matching part is positioned by matching with the housing and will not be changed along with the change of the shape of the slide guide.

Optionally, the matching part is provided thereon with a positioning brim, a locating slot is provided in an inner wall of the housing, and the locating slot is positioned by engaging with the positioning brim.

Optionally, the matching part is shaped as a ring structure as a whole, and the matching part is located outside of the limiting part.

Optionally, the housing comprises an upper housing and a lower housing located below the upper housing, and the matching part is contacted and matched with the upper housing and the lower housing at the same time.

Optionally, the slide guide is shaped as a hollow strip, a cross section thereof is of a shape selected from rectangular, square and semicircle, or a combined shape from rectangular and semicircle, or a combined shape from square and semicircle.

Optionally, the slide guide comprises a first slide guide and a second slide guide used in conjunction with the first slide guide, the first slide guide and the second slide guide are positioned by matching with the limiting part at the same time.

Optionally, the slide guide fastener is provided therein with a through-hole for mounting a spindle, the limiting part comprises a first limiting part and a second limiting part, the first limiting part is provided outside of the through-hole, the first limiting part is further located outside of the slide guide and can be changed with different shapes of the slide guide, and the second limiting part is positioned by matching with a locating structure provided in the first slide guide or the second slide guide.

Optionally, the second limiting part is provided between the through-hole and the first limiting part.

Optionally, a front cover and the slide guide fastener are provided at two ends of the slide guide respectively.

Optionally, a driving block is sheathed around the slide guide, the driving block is driven by and connected with the spindle, and the driving block is movable on the slide guide.

Optionally, the positioning brim comprises a plurality of protrusions arranged at intervals, the locating slots are positioned by one-to-one correspondingly matching with the plurality of protrusions.

Optionally, the upper housing is provided with a first half hole, the lower housing is provided with a second half hole, the locating slot is provided on the hole walls of the first half hole and the second half hole.

Optionally, the locating structure is of one structure selected from a U-shaped structure, a half I-shaped structure and a hollow T-shaped structure.

Optionally, the actuator further comprises a worm gear, the worm gear is mounted in the housing, the worm gear is driven by and connected with a rotating shaft of the motor, one end of the spindle is driven by and connected with the worm gear.

Optionally, a central hole is provided in the worm gear, one end of the spindle is inserted into the central hole, and the spindle is synchronously rotatable along with the worm gear.

Compared with the prior art, in the actuator of the present application, when the shape of the slide guide is changed, the limiting part will be changed along with different shapes of the slide guides, but the matching part remains unchanged, such that various slide guides with different shapes can match with the housing to be used, which is beneficial for the standardization of the housing of the actuator, and thus the producing cost will be lowered.

In order to make the purpose, the technical features and the advantages of the present application more clear, the present application will be described in detail hereinafter with reference to accompanying drawings and embodiments. It should be understood that the specific embodiments described herein are merely exemplary, and that the present invention is not limited thereto.

It should be noted that an element can be provided on another element directly or indirectly when the element is described as being fixed or provided on the another element, and an element can be connected with another element directly or indirectly when the element is described as being connected with the another element.

It should also be noted that the orientation terms used in these embodiments, such as left, right, top and bottom, are merely relative concepts to each other or refer to the normal using state of a product, but should not be considered as any limitation.

Figure 2:
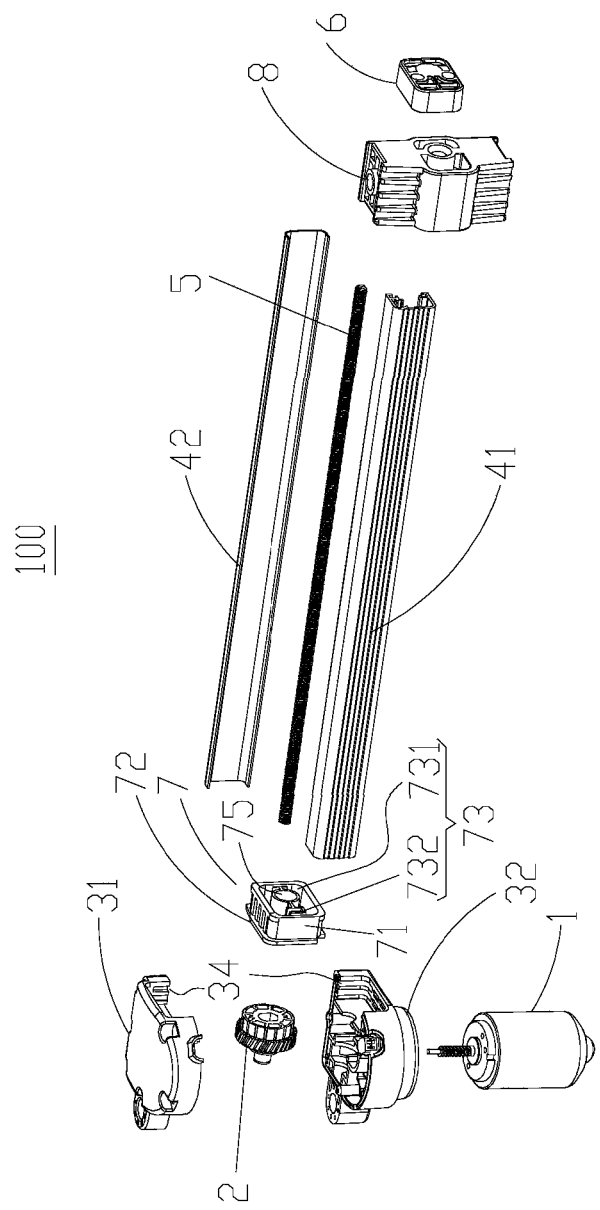
FIG. 2 is a schematic exploded perspective view of the actuator of the first embodiment of the present application.
Figure 3:
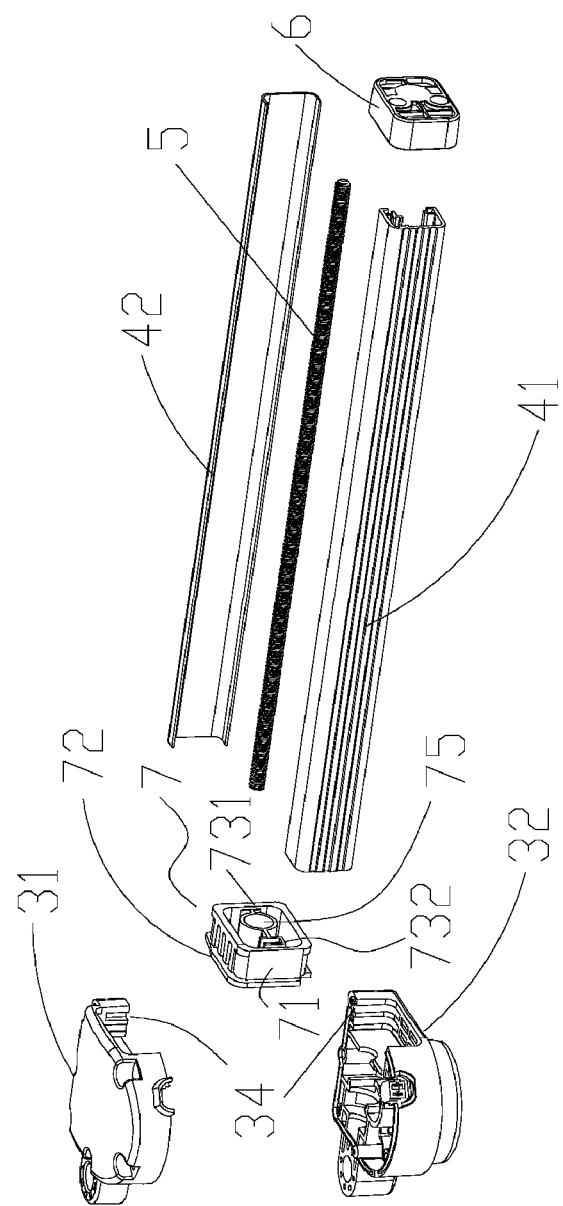
FIG. 3 is a partially exploded structural schematic view of FIG. 2.

As shown in FIG. 1 to FIG. 3, an actuator 100 of a first embodiment of the present application comprises: a motor 1; a housing 3, wherein the housing 3 covers around the motor 1, and the motor 1 is provided in the housing 3; a slide guide 4, wherein one end of the slide guide 4 extends into the housing 3, the other end of the slide guide 4 extends outside of the housing 3, and a slide guide fastener 7 is limited between the slide guide 4 and the housing 3; the slide guide fastener 7 is provided with a limiting part 73 and a matching part 71, the limiting part 73 is positioned by matching with the slide guide 4, and the structure and the shape of the limiting part 73 can be changed along with different shapes of the slide guide 4; the matching part 71 is positioned by matching with the housing 3, and the structure and the shape of the matching part 71 will not be changed along with the change of the shape of the slide guide 4, that is, when another slide guide 4 of which the shape is different from the shape of the previous slide guide replaces the previous slide guide, the structure and the shape of the matching part 71 of the slide guide fastener 7 replaced along with the slide guide 4 will not be changed, while the structure of the shape of the limiting part 73 will be changed along with the change of the shape of the slide guide 4, such that the slide guide fastener 7 can remain matching with the housing 3 through the matching part 71, the housing 3 does not need to be replaced, and the slide guide 4 can be fixed at the same time.

As shown in FIG. 2 and FIG. 3, the housing 3 comprises an upper housing 31 and a lower housing 32, the upper housing 31 is provided above the motor 1, the lower housing 32 is sheathed around the motor 1, a lower end face of the upper housing 31 is engaged with an upper end face of the lower housing 32 to be positioned and thereby form a cavity, a worm gear 2 is provided in the cavity and can be moved by matching with a rotating shaft of the motor 1.

As shown in FIG. 2 and FIG. 3, the slide guide 4 is rod-like shaped as a whole, the cross section thereof is of one shape selected from rectangular, square and semicircle, or the cross section thereof is of a combined shape from rectangular and semicircle, or the cross section thereof is of a combined shape from square and semicircle. Preferably, the shape of the cross section of the slide guide 4 of the first embodiment is rectangular or square. A front cover 6 and the slide guide fastener 7 are provided at two ends of the slide guide 4 respectively, a spindle 5 is located in the slide guide 4, the spindle 5 is provided through a central hole of the worm gear 2, the movement of the motor 1 can drive the worm gear 2 to move, and the movement of the worm gear 2 can drive the spindle 5 to rotate in the slide guide 4; a driving block 8 is sheathed around the slide guide 4, and the driving block 8 is driven by and connected with the spindle 5, the rotation movement of the spindle 5 can be transformed into a straight reciprocating movement by the driving block 8; the driving block 8 is moved on the slide guide 4, and the slide guide fastener 7 is fixed at one end of the slide guide 4. The slide guide 4 can be made of plastic or of pure metal, and can also be made of alloy.

In the first embodiment, the slide guide 4 comprises a first slide guide 41 and a second slide guide 42, the first slide guide 41 is matched with the second slide guide 42, such that the slide guide 4 is rod-like shaped as a whole.

As shown in FIG. 1 to FIG. 3, the slide guide fastener 7 is provided at one end of the slide guide 4, and the slide guide fastener 7 is engaged between the upper housing 31 and the lower housing 32, such that the slide guide 4 is positioned by matching with the upper housing 31 and the lower housing 32. In a practical application, the slide guide fastener 7 can also be positioned with the housing 3 by a screw or be locked at one end of the slide guide 4 by a screw. The front cover 6 is provided at the other end of the slide guide 4, the front cover 6 and the slide guide fastener 7 is fixed at two ends of the slide guide 4 at the same time, such that the two ends of the slide guide 4 can be sealed. The slide guide 4 can be modularized by the technical solution. The slide guide fastener 7 is further provided with a through-hole 75, the spindle 5 is runs through the through-hole 75, and then extends into the central hole of the worm gear 2. The matching part 71 is provided thereon with an out-protruding positioning brim 72, wherein the positioning brim 72 can be an annular protrusion provided on an outer wall of the slide guide fastener 7, however, the positioning brim 72 can also be a continuous protrusion provided on one or more surface(s) of a top surface, a left side surface, a right side surface and a bottom surface of the outer wall of the slide guide fastener 7; a locating slot 34 is provided in an inner wall of the housing 3, and the locating slot 34 is positioned by engaging with the positioning brim 72. The matching part 71 is shaped as a ring structure as a whole, the matching part 71 is in contact and matched with the upper housing 31 and the lower housing 32 at the same time. The matching part 71 remains unchanged when the shape of the slide guide 4 is changed, that is, the matching part 71 comprises the outer wall of the slide guide fastener 7 and the positioning brim 72 provided on the outer wall, at this time, the positioning brim 72 is provided on an edge of the outer wall adjacent to the worm gear 2, the shapes of both the outer wall and positioning brim 72 remain unchanged and are matched with the housing 3, but the shape of the limiting part 73 is changed along with the change of the shape of the slide guide 4. Furthermore, the positioning brim 72 can also extend towards another side of the outer wall (that is, the matching part 71 itself can have a variety of shapes, the matching part of each shape is matched with the housing 3 and does not change along with the change of the shape of the slide guide 4). At this time, the positioning brim 72 comprises a plurality of protrusions (not marked) provided at intervals, wherein the plurality of protrusions can be circularly provided on the outer wall of the slide guide fastener 7 and can be also provided on one or more surface(s) of a top surface, a left surface, a right surface and a bottom surface of the outer wall of the slide guide fastener 7. The locating slots 34 are positioned by one-to-one correspondingly matching with the plurality of protrusions, specifically, the upper housing 31 is provided with a first half hole, the lower housing 32 is provided with a second half hole, and the locating slots 34 are provided on hole walls of the first half hole and the second half hole. The locating slots 34 can be a circular recess groove and also be a plurality of blind holes provided at intervals.

The limiting part 73 comprises a first limiting part 731 and a second limiting part 732, one end of the slide guide 4 is inserted between the first limiting part 731 and the second limiting part 732 and extends into the cavity, such that the first limiting part 731 is located outside of the slide guide 4 and can be changed along with the different shapes of the slide guide 4, and the second limiting part 732 can be changed along with the change of the structure of an inter wall of the slide guide 4; a locating structure is provided inside the first slide guide 41 or the second slide guide 42, and the second limiting part 732 is positioned by matching with the locating structure. The slide guide fastener 7 is provided with an annular wall 74, the matching part 71 is the outer wall of the annular wall 74, the first limiting part 731 is the inner wall of the annular wall 74, and the second limiting part 732 is provided between the first limiting part 731 and the through-hole 75.

Figure 6:
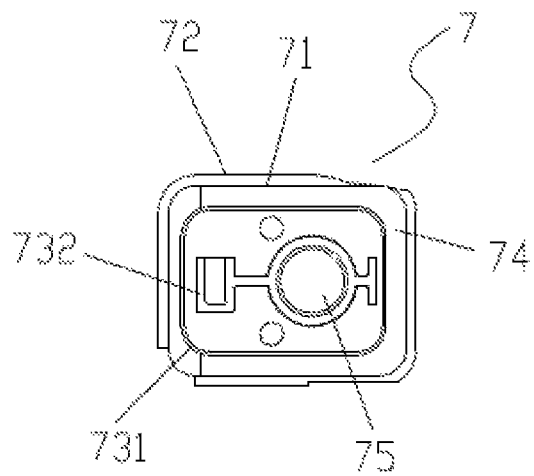
FIG. 6 is a front view of the slide guide fastener of the actuator of the first embodiment of the present application.

As shown in FIG. 1 to FIG. 3, in the first embodiment, the first slide guide 41 is matched with the second slide guide 42, and cross sections of both the two slide guides are half I-shaped, such that the cross section of the whole slide guide 4 is approximately rectangular or square in shape. As shown in FIG. 6, it can be seen from the front view of the slide guide fastener 7 that the first limiting part 731 is rectangular or square in shape, and the second limiting part 732 is upright U-shaped.

Figure 4:
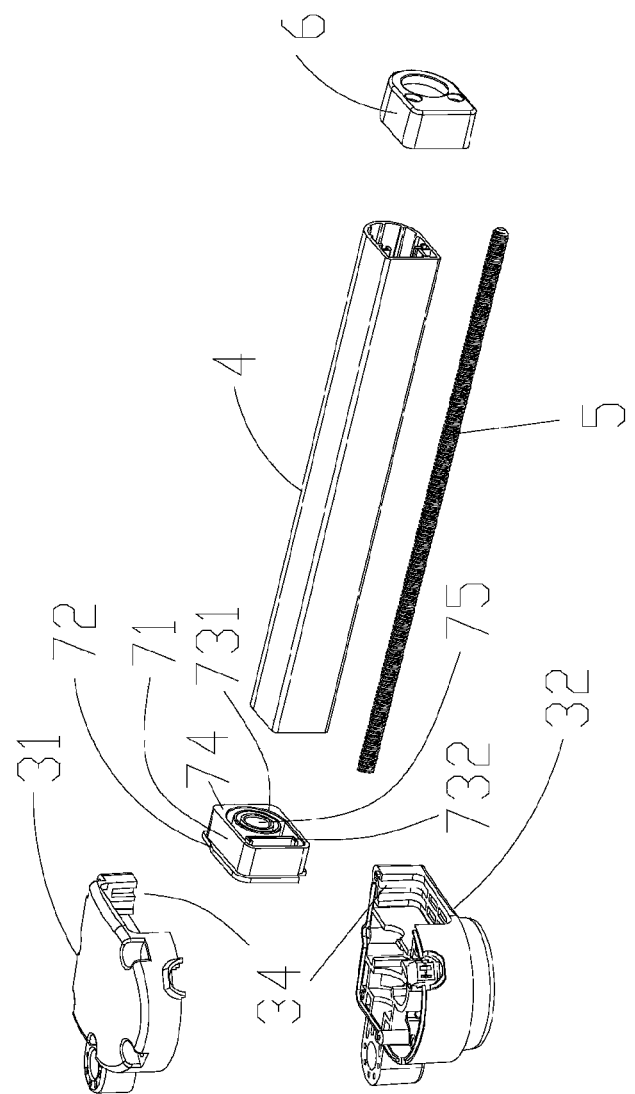
FIG. 4 is a schematic perspective view of a slide guide and a corresponding slide guide fastener of an actuator of a second embodiment of the present application.
Figure 7:
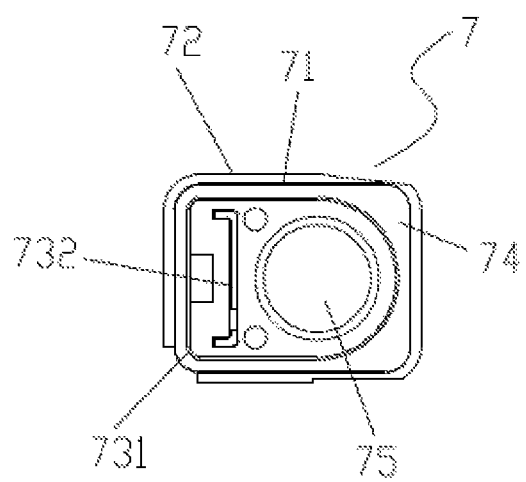
FIG. 7 is a front view of the slide guide fastener of the actuator of the second embodiment of the present application.

As shown in FIG. 4, differences between a second embodiment and the first embodiment are as follows: in the second embodiment, the slide guide 4 is shaped as one piece, and the cross section thereof is shaped as a square combined with a semicircle on the right or a rectangle combined with a semicircle. At this time, the wall thickness of a part of the annular wall 74 is changed, as shown in FIG. 7, it can be seen from the front view of the slide guide fastener 7 that the cross section of the first limiting part 731 is shaped as a square combined with a semicircle on the right or a rectangle combined with a semicircle, the second limiting part 732 is left-providing U-shaped, which means that an opening of the U shape faces leftwards (as shown in FIG. 7).

Figure 5:
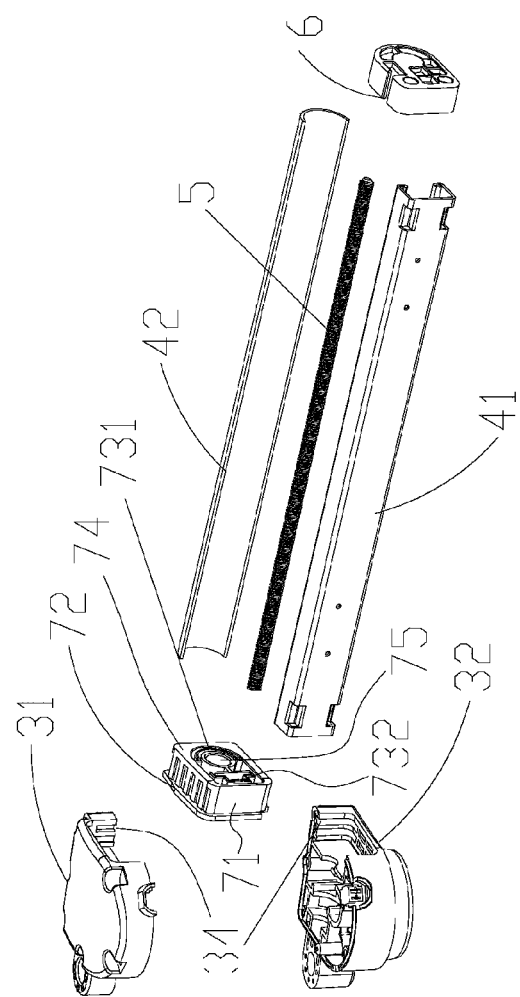
FIG. 5 is a schematic perspective view of a slide guide and a corresponding slide guide fastener of an actuator of a third embodiment of the present application.
Figure 8:
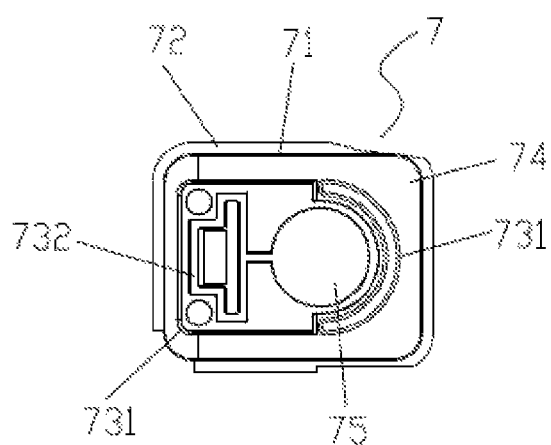
FIG. 8 is a front view of the slide guide fastener of the actuator of the third embodiment of the present application.

As shown in FIG. 5, main differences between a third embodiment and each of the above-mentioned first embodiment and second embodiment are as follows: the slide guide 4 of the third embodiment is also shaped as two pieces, similar to the slide guide 4 of the first embodiment; however, the cross section of the second slide guide 42 is shaped as a semicircle. The thickness of the annular wall 74 is changed again, as shown in FIG. 8, it can be seen from the front view of the slide guide fastener 7 that the first limiting part 731 corresponding to the first slide guide 41 is shaped as an approximate rectangle or square, and the first limiting part 731 corresponding to the second slide guide 42 is shaped as a semicircle. The two limiting parts 731 are not continuous (i.e., provided at intervals), and the second limiting part 732 is right-providing hollow T-shaped.

The shape of the limiting part 73 can be changed by replacing the whole set of moulds used to produce the slide guide fastener 7 or by changing a part of inserts of the moulds used to produce the slide guide fastener 7. When the slide guide 4 is replaced, only the limiting part 73 needs to be changed, and both the matching part 71 on the slide guide fastener 7 and the housing 3 keep being unchanged, that is, the housing 3 can be matched with various slide guides 4 without modification to any structure of the housing 3, which contributes to the standardization of the housing 3, such that slide guide 4 with different shapes can be matched with the housing 3 to use.

To sum up, the actuator of the present application has the following beneficial effects:
1. slide guides 4 with a variety of different shapes can be matched with one type of housing 3, which contributes to the standardization of the housing 3.
2. When the shape of the slide guide 4 is changed, only the shape of the limiting part 73 in the slide guide fastener 7 needs to be changed, which is beneficial for simplifying the mould required to produce the slide guide.
3. A matching wall surface of the matching part 71 is shaped as an annular structure as a whole, and the matching wall surface is provided thereon with the positioning brim 72, such that the slide guide 4 and the housing 3 are tightly cooperated with each other by the cooperation between the matching part 71 of the slide guide fastener 7 and the housing 3 and also by the cooperation between the limiting part 73 and the slide guide 4.

The foregoing contents are some preferable embodiments of the present invention merely, and are not regarded as limiting the protection scope of the present invention, within the spirit and principles disclosed in the present invention, any modification, equivalent replacement and amendment should fall within the protection scope of the present invention. The present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:
1. An actuator, comprising:
   a motor;
   a housing, the housing at least partially covering the motor;
   a slide guide, wherein one end of the slide guide extends into the housing and another end of the slide guide extends outside of the housing; and
   a slide guide fastener disposed between an outer surface of an end of the slide guide and an inner wall of the housing, the slide guide fastener comprising a limiting part and a matching part, wherein the limiting part is configured to engage with the slide guide and to be interchangeable with other limiting parts corresponding to other slide guide shapes, and wherein the matching part is configured to engage with the housing and does not need to be changed to accommodate different slide guide shapes;
   wherein the slide guide fastener is detachably connected at the housing,
   wherein the slide guide fastener comprises a through-hole for mounting a spindle,
   wherein the limiting part comprises a first limiting part and a second limiting part, the first limiting part being disposed outside of the through-hole and outside of the slide guide, and
   wherein the second limiting part is disposed between the through-hole and the first limiting part.
2. The actuator according to claim 1, wherein the matching part comprises a positioning brim,
   wherein the inner wall of the housing includes a locating slot, the slide guide fastener being connected to the housing at the locating slot, and
   wherein the locating slot is configured to engage with the positioning brim.
3. The actuator according to claim 1, wherein the matching part as a whole is shaped as a ring structure, and wherein the matching part is located outside of the limiting part.
4. The actuator according to claim 1, wherein the housing comprises:
   an upper housing; and
   a lower housing located below the upper housing;
   wherein the matching part is engaged with both the upper housing and the lower housing.
5. The actuator according to claim 1, wherein the slide guide is shaped as a hollow strip, and wherein a cross section of the slide guide comprises a rectangular shape, a square shape, a semicircle shape, a combined rectangle and semicircle shape, and/or a combined square and semicircle shape.
6. The actuator according to claim 1, wherein the slide guide comprises:
   a first slide guide; and
   a second slide guide used in conjunction with the first slide guide;
   wherein the first slide guide and the second slide guide are both engaged with the limiting part.
7. The actuator according to claim 6, wherein the second limiting part is configured to engage with a locating structure provided in the first slide guide or the second slide guide.
8. The actuator according to claim 1, wherein the slide guide fastener is disposed at the end of the slide guide that extends into the housing, and a front cover is provided at the other end of the slide guide.
9. The actuator according to claim 7, further comprising:
   a driving block sheathed around the slide guide, wherein the driving block is configured to be driven by and connected with the spindle, and wherein the driving block is movable on the slide guide.
10. The actuator according to claim 2, wherein the positioning brim comprises a plurality of protrusions arranged at intervals, wherein the plurality of protrusions correspond one-to-one with a plurality of locating slots.
11. The actuator according to claim 4, wherein the upper housing comprises a first hole portion, wherein the lower housing comprises a second hole portion, and wherein a locating slot is provided on walls of the first hole portion and the second hole portion.

12. The actuator according to claim 7, wherein the locating structure is a U-shaped structure, a half I-shaped structure, or a hollow T-shaped structure.

13. The actuator according to claim 9, further comprising:
a worm gear mounted in the housing, wherein the worm gear is configured to be driven by and connected with a rotating shaft of the motor, and wherein one end of the spindle is configured to be driven by and connected with the worm gear.

14. The actuator according to claim 13, wherein the worm gear comprises a central hole, wherein one end of the spindle is inserted into the central hole, and wherein the spindle is synchronously rotatable with the worm gear.

15. An actuator, comprising:
a motor;
a housing, the housing at least partially covering the motor;
a slide guide, wherein one end of the slide guide extends into the housing and another end of the slide guide extends outside of the housing; and
a slide guide fastener disposed between an outer surface of an end of the slide guide and an inner wall of the housing, the slide guide fastener comprising a limiting part and a matching part, wherein the limiting part is configured to engage with the slide guide and to be interchangeable with other limiting parts corresponding to other slide guide shapes, and wherein the matching part is configured to engage with the housing and does not need to be changed to accommodate different slide guide shapes;
wherein the slide guide fastener is detachably connected at the housing,
wherein the inner wall of the housing includes a locating slot, the slide guide fastener being connected to the housing at the locating slot,
wherein the matching part comprises a positioning brim,
wherein the locating slot is configured to engage with the positioning brim,
wherein the positioning brim comprises a plurality of protrusions arranged at intervals, and
wherein the plurality of protrusions correspond one-to-one with a plurality of locating slots.

* * * * *